(12) United States Patent
Cheston et al.

(10) Patent No.: US 7,555,679 B2
(45) Date of Patent: Jun. 30, 2009

(54) SYSTEM AND METHOD FOR COMPUTER SYSTEM REJUVENATION

(75) Inventors: Richard W. Cheston, Morrisville, NC (US); Daryl Carvis Cromer, Apex, NC (US); Howard Jeffrey Locker, Cary, NC (US); Rod David Waltermann, Rougemont, NC (US)

(73) Assignee: Lenovo (Singapore) Pte Ltd, Singapore (SG)

( * ) Notice: Subject to any disclaimer, the term of this patent is extended or adjusted under 35 U.S.C. 154(b) by 591 days.

(21) Appl. No.: 10/963,887

(22) Filed: Oct. 13, 2004

(65) Prior Publication Data

US 2006/0085685 A1 Apr. 20, 2006

(51) Int. Cl.
G06F 11/00 (2006.01)

(52) U.S. Cl. .......................... 714/38; 714/37; 717/168; 717/170; 717/175

(58) Field of Classification Search ................... 714/38, 714/37
See application file for complete search history.

(56) References Cited

U.S. PATENT DOCUMENTS

| | | | | |
|---|---|---|---|---|
| 5,715,386 | A * | 2/1998 | Fulton et al. ................... | 714/38 |
| 5,745,669 | A | 4/1998 | Hugard et al. .......... | 395/182.01 |
| 6,374,366 | B1 * | 4/2002 | Maffezzoni ................... | 714/27 |
| 6,519,762 | B1 | 2/2003 | Colligan et al. ............... | 717/11 |
| 6,594,781 | B1 | 7/2003 | Komasaka et al. ............ | 714/19 |
| 6,604,118 | B2 * | 8/2003 | Kleiman et al. ............. | 707/203 |
| 6,611,850 | B1 * | 8/2003 | Shen .......................... | 707/204 |
| 6,615,365 | B1 * | 9/2003 | Jenevein et al. ................ | 714/6 |
| 6,629,266 | B1 | 9/2003 | Harper et al. ................. | 714/38 |
| 6,684,229 | B1 * | 1/2004 | Luong et al. ................ | 707/204 |
| 6,732,293 | B1 * | 5/2004 | Schneider .................... | 714/15 |
| 6,823,376 | B1 * | 11/2004 | George et al. ................ | 709/221 |
| 6,845,464 | B2 * | 1/2005 | Gold .............................. | 714/6 |
| 6,934,881 | B2 | 8/2005 | Gold et al. .................... | 714/15 |
| 6,948,038 | B2 * | 9/2005 | Berkowitz et al. .......... | 711/162 |
| 6,976,062 | B1 * | 12/2005 | Denby et al. ................. | 709/220 |
| 7,028,058 | B2 * | 4/2006 | Russon ........................ | 707/204 |
| 7,100,079 | B2 * | 8/2006 | Gross et al. ................... | 714/23 |

(Continued)

OTHER PUBLICATIONS

Office action for U.S. Appl. No. 10/964,149, filed Oct. 5, 2007, 11 pages.

(Continued)

*Primary Examiner*—Scott T. Baderman
*Assistant Examiner*—Loan Truong
(74) *Attorney, Agent, or Firm*—VanLeeuwen & VanLeeuwen; Carlos Munoz-Bustamante

(57) ABSTRACT

A system and method that rejuvenates a computer system is provided. The user uses the computer system that includes an operating system and applications for a first period of time creating data files and applying patches to the operating system and applications. An image is created of the primary drive and stored on a second nonvolatile storage area. In one embodiment, the second nonvolatile storage area is a hidden partition of a hard drive. The user continues using the system during a second period of time. When the computer system becomes sluggish, the primary drive is reformatted and the image is copied from the second nonvolatile storage area to the primary drive. In addition, patches and applications installed after the image was created are stored to the second nonvolatile storage area and reapplied and reinstalled on the primary drive after the image has been copied to the primary drive.

20 Claims, 11 Drawing Sheets

U.S. PATENT DOCUMENTS

| | | | |
|---|---|---|---|
| 7,111,201 B2 | 9/2006 | Largman et al. | 714/36 |
| 7,111,292 B2 | 9/2006 | Bonnett et al. | 717/171 |
| 7,137,034 B2 | 11/2006 | Largman et al. | 714/23 |
| 7,216,251 B2 | 5/2007 | Gaunt et al. | 714/6 |
| 7,219,257 B1* | 5/2007 | Mahmoud et al. | 714/6 |
| 7,370,234 B2* | 5/2008 | Stakutis et al. | 714/15 |
| 2001/0044807 A1* | 11/2001 | Kleiman et al. | 707/203 |
| 2002/0042892 A1 | 4/2002 | Gold | 714/6 |
| 2002/0049718 A1 | 4/2002 | Kleiman et al. | 707/1 |
| 2002/0053044 A1* | 5/2002 | Gold et al. | 714/38 |
| 2002/0087855 A1 | 7/2002 | Dykes et al. | 713/2 |
| 2002/0184559 A1* | 12/2002 | Qin et al. | 714/13 |
| 2002/0194535 A1* | 12/2002 | Largman et al. | 714/13 |
| 2003/0163493 A1 | 8/2003 | Burns et al. | 707/204 |
| 2003/0221095 A1 | 11/2003 | Gaunt et al. | 713/1 |
| 2004/0088694 A1* | 5/2004 | Ho | 717/170 |
| 2004/0128664 A1 | 7/2004 | Johnson | 717/168 |
| 2004/0139128 A1* | 7/2004 | Becker et al. | 707/204 |
| 2004/0153733 A1 | 8/2004 | Lin | 714/6 |
| 2005/0144609 A1 | 6/2005 | Rothman et al. | 717/168 |
| 2006/0085686 A1* | 4/2006 | Cheston et al. | 714/38 |

OTHER PUBLICATIONS

Office action for U.S. Appl. No. 10/964,149, filed Mar. 26, 2008, 13 pages.

Office action for U.S. Appl. No. 10/964,149, mailed Jul. 9, 2008, 12 pages.

* cited by examiner

SYSTEM AND METHOD FOR COMPUTER SYSTEM REJUVENATION

BACKGROUND OF THE INVENTION

1. Technical Field

The present invention relates in general to a system and method for rejuvenating a computer system. In particular, the present invention relates to a system and method for restoring a previously saved system image, automatically applying any patches to the image, and retaining user files and customizations.

2. Description of the Related Art

Personal computer systems are relatively inexpensive and often provide exceptional computer power to an individual user. The personal computer systems each have a power supply, one or more processors, memory, nonvolatile storage, and input/output (I/O) devices that typically include a display monitor, a keyboard, and a selection device, such as a mouse. Personal computer systems provide flexibility in that a user can use the personal computer system whenever power is available to the system. Applications loaded on the personal computer system are therefore available whenever the user wishes to use them.

When a computer is first set up, an operating system, such as Linux™ or Microsoft Windows™, is installed to control operation of the computer system. Modern operating systems are often very complex and include "metadata" describing the applications and other files that are installed on the system. When an application is installed, the operating system records data about the application (metadata). In some operating systems, the metadata is stored in a database. In the Microsoft Windows™ operating system, the database is referred to as a "registry."

In theory, when an application is removed from the system the registry data is removed as well. Likewise, when a user upgrades from one version of an application to another, the new version information is supposed to overwrite the original version information. However, in practice, data in the registry is often not deleted or updated correctly and, over time, the registry becomes unduly cumbersome and/or corrupted causing the operating system to take considerable time to retrieve application settings and perform user requests.

To address this challenge, some programs have been marketed, such as GoBack™, that allows the user to remove a latest set of changes. While this is useful to counteract a poorly behaved program that is newly installed, the problem of these types of programs is that they only allow the user to revert back a certain amount of time, depending upon the storage allocated to the program. Another problem with these types of programs is that they remove both the good and the bad—while a poorly behaved program may be removed, the program will also remove security patches and other patches that have been applied to well behaved applications. The removal of these patches, especially those to the operating system, can leave a system exposed to attacks from malicious users over a network, such as the Internet.

What is needed, therefore, is a system and method that allows a user to capture images of the primary drive onto a second nonvolatile storage device so that when system performance becomes sluggish, one of the saved images can be copied from the second nonvolatile device to the primary drive. Furthermore, what is needed is a system and method that retains the user data and customizations made to applications. Finally, what is needed is a system and method that re-applies patches to the operating system and applications stored in the image.

SUMMARY

It has been discovered that the aforementioned challenges are resolved using a system and method that stores images of the primary drive to a second nonvolatile storage area so that the user can apply one of the images to the primary drive while also retaining the user's data and any configuration preferences added to the operating system or applications.

Upon production or purchase of the computer system, an original image of the primary drive is created and stored on the second nonvolatile storage area. Periodically, either upon user request or at scheduled times, other complete images of the primary drive are created and stored on the second nonvolatile storage area. In addition, when patches are released by software vendors in support of the operating system or applications, the patch is applied to the operating system or application and a copy of the patch is stored in the second nonvolatile storage area.

If the computer system is sluggish or is operating inefficiently, the user requests "rejuvenation" of the computer system. When rejuvenation is requested, the user selects an image from a list of images available on the second nonvolatile storage area. A comparison is made between the selected image and the current primary drive to determine if any applications have been added since the image was created. If applications have been added, a list of applications not included in the selected image is displayed informing the user that the applications will not be included in the rejuvenated systems and will have to be installed separately if the user wishes to continue using such applications.

The computer system is disconnected from any networks so that the computer is not vulnerable to attack while the rejuvenation process is taking place. During the rejuvenation process, the user's data files and application settings are copied from the primary drive to the second nonvolatile storage area. After the files are copied, the primary drive is reformatted. The image selected by the user is copied from the second nonvolatile storage area to the primary drive. As previously described, the image selected by the user includes the operating system and whatever applications were on the primary drive at the time the image was created. Next, patches that were saved on the second nonvolatile storage area are applied to the operating system and applications. The user's data files are then moved back from the second nonvolatile storage area to the primary drive along with any application and operating system preferences.

At this point, the computer system has been rejuvenated with the operating system and applications included in the selected image, patches have been applied, and the user's data files and application/operating system configuration settings have been loaded on the primary drive. In addition, any programs that were not included in the selected image have been removed from the primary drive and the operating system's metadata, such as the registry, has been restored to the state that existed at the time the selected image was created. In this manner, registry entries and poorly behaving programs that may have been causing the inefficient, sluggish, computer performance have been removed, thus improving system performance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

It will be appreciated by those skilled in the art that the primary drive can be a single physical and logical drive, or can consist of multiple drives (e.g., "c:", "d:", etc.). As used herein, the term primary drive is used to refer to the drives onto which the current version of the operating system, applications, and user data are stored, irregardless of whether one or multiple drives are used to store the data. Likewise, as used herein, a "second nonvolatile storage area" refers to a drive other than the primary drive. In a preferred embodiment, the second nonvolatile storage area is a hidden partition on a hard drive installed in the computer system. However, the second nonvolatile storage area can include one or more drives either physically or logically separated from the primary drive. For example, the second nonvolatile storage area could be a removable drive connected to the computer system with a firewire or USB interface or could even be a CD-RW or a DVD-RW disk. In addition, the second nonvolatile storage area can be a network-accessible drive.

Figure 1:
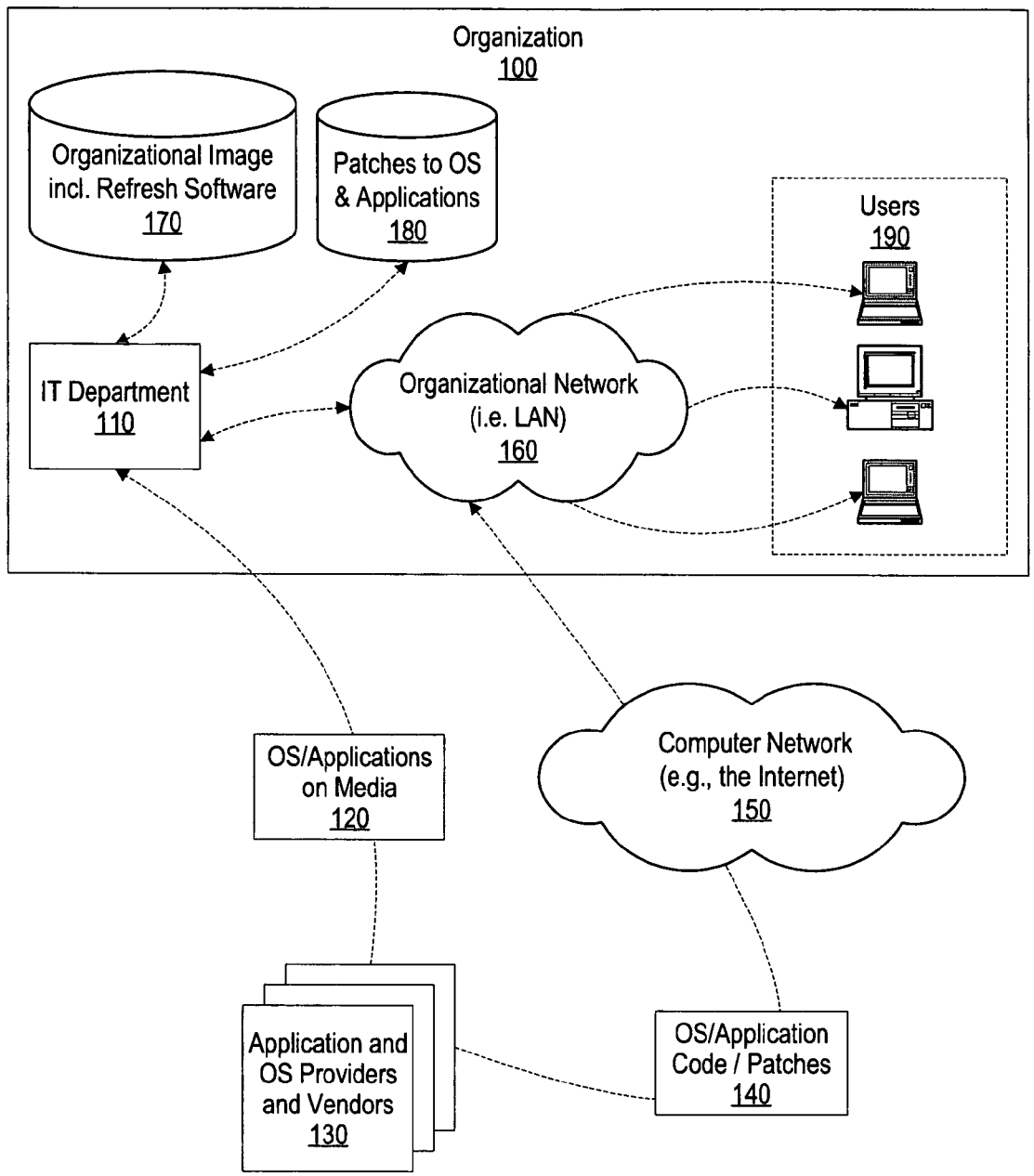
FIG. 1 is a system diagram showing an organization's computer systems being restored to an approved image.

FIG. 1 is a system diagram showing an organization's computer systems being restored to an approved image. Organization 100, such as a corporation, nonprofit organization, government agency, or the like, includes information technology department (IT department) 110. IT department 110 sets up organizational information technology policies and procedures, purchases equipment and software for the organization, maintains organizational network 160 used to interconnect the organization's computing resources, and assists employees and other authorized organizational uses with their computing needs. In a small organization, IT department 110 may consist of a single individual or may be a large department as found in the largest corporations.

IT department 110 purchases (licenses) the operating system(s) and applications that will be used by the organization from application and operating system vendors 130. Operating system and application code can be received on media 120, such as OD-ROMs, that are physically received by the IT department. In addition, the IT department may purchase applications and/or the operating systems from an online vendor. In an online purchase, code 140 is sent through a computer network, such as the Internet, where it is received at the organization's network 160 and stored on one of the IT department's computer systems.

IT department 110 uses the operating system and application software that was received, either on media and/or code received through the network, to create one or more approved images. In a small organization, a single image may suffice with each person in the organization using the same operating system and set of applications. In a larger organization, multiple approved images may be needed in order to control costs as well as to provide each person with the operating system and applications that they need. For example, an image may be created for managers with one operating system and applications used by managers, while a different image may be created for software developers with a different operating system and a different set of applications needed for software development.

The IT department includes "restoration" software (a restoration software tool) along with the approved image(s) and stores the approved images and restoration software in nonvolatile storage area 170. These approved images (including the restoration software) are loaded on computer systems and deployed to users 190. Periodically, application and operating system vendors release fixes, or patches, to their software. These patches are typically released through online services available from computer network 150 (e.g., available for download through the Internet). Patch code 140 is received by IT department 110 through computer network 150 and the organization's network 160. Patches generally address problems identified by the software vendors after release of the operating system and/or applications. Some of these problems relate to security vulnerabilities and, therefore, are sometimes critical in order to prevent exploitation by hackers, viruses and other malfeasant software ("malware"). In some organizations, patches are evaluated by the IT department before being distributed to users 190, while in other organizations the patches are downloaded directly by the end users. The IT department stores copies of patches to the operating system and applications included in the organizations approved image(s) in nonvolatile storage area 180.

Figure 2:
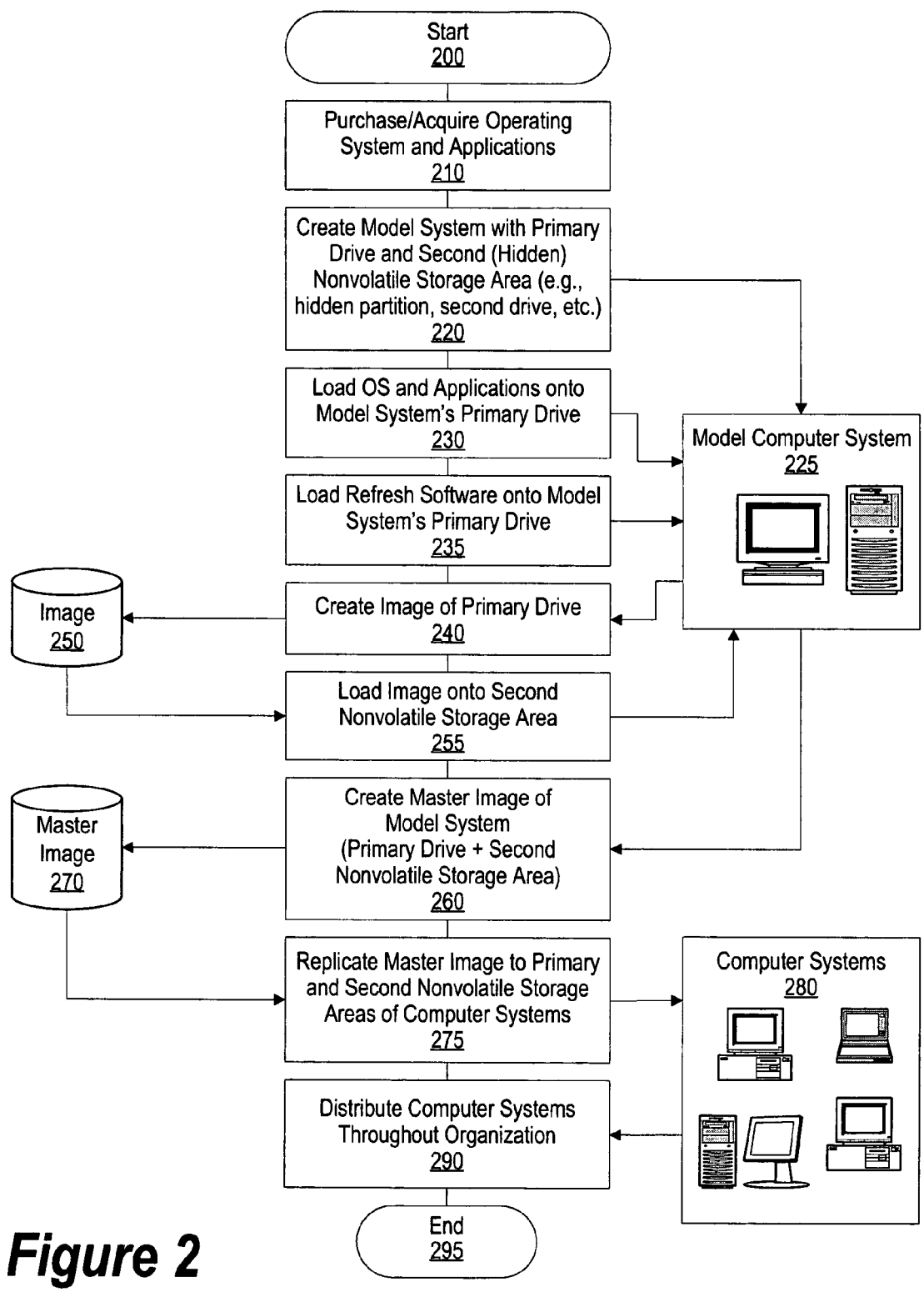
FIG. 2 is a flowchart showing set up steps taken to set up an organization's computer systems.
Figure 3:
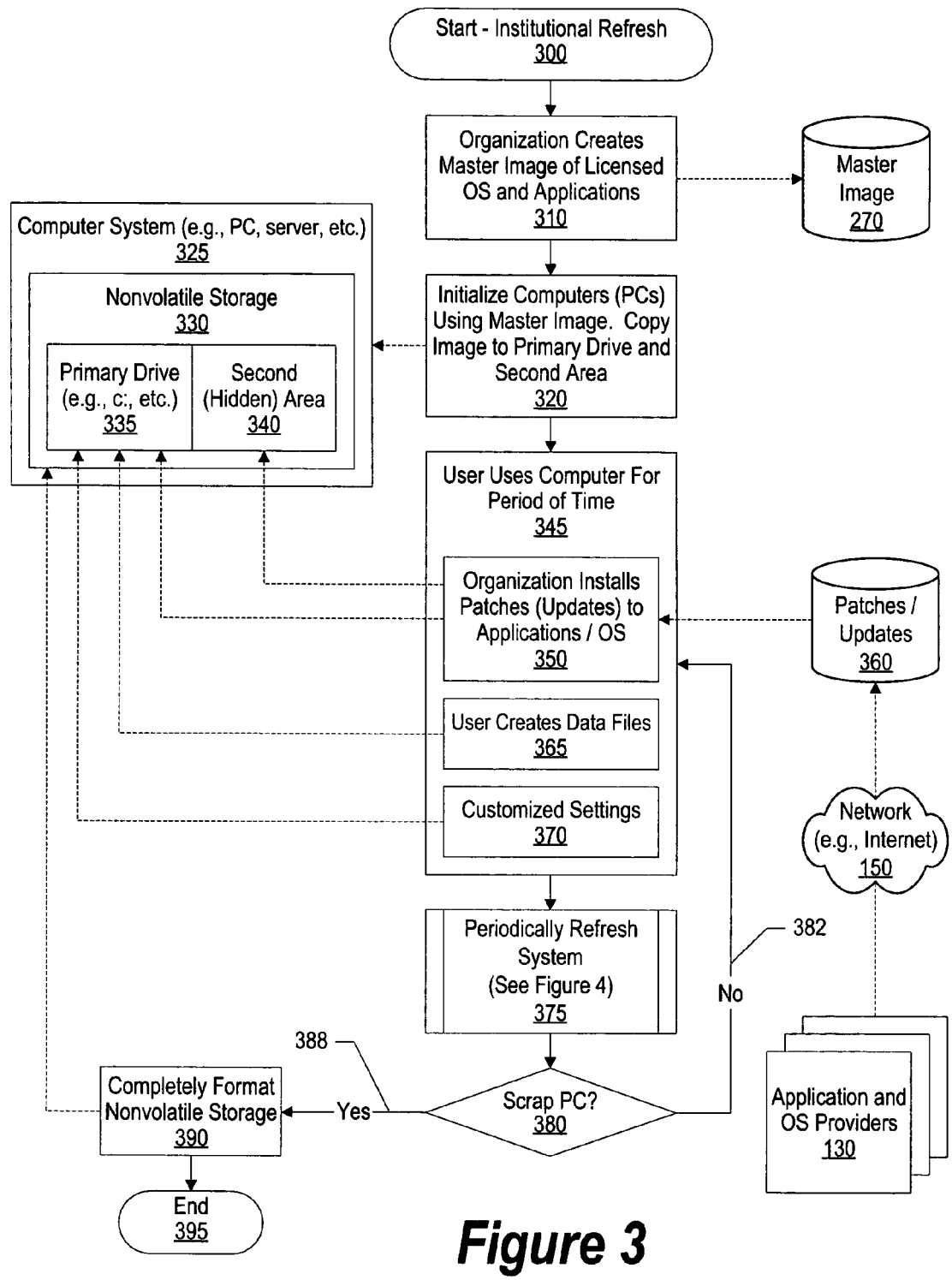
FIG. 3 is a first flowchart showing the steps taken to restore an organization's computer systems.
Figure 4:
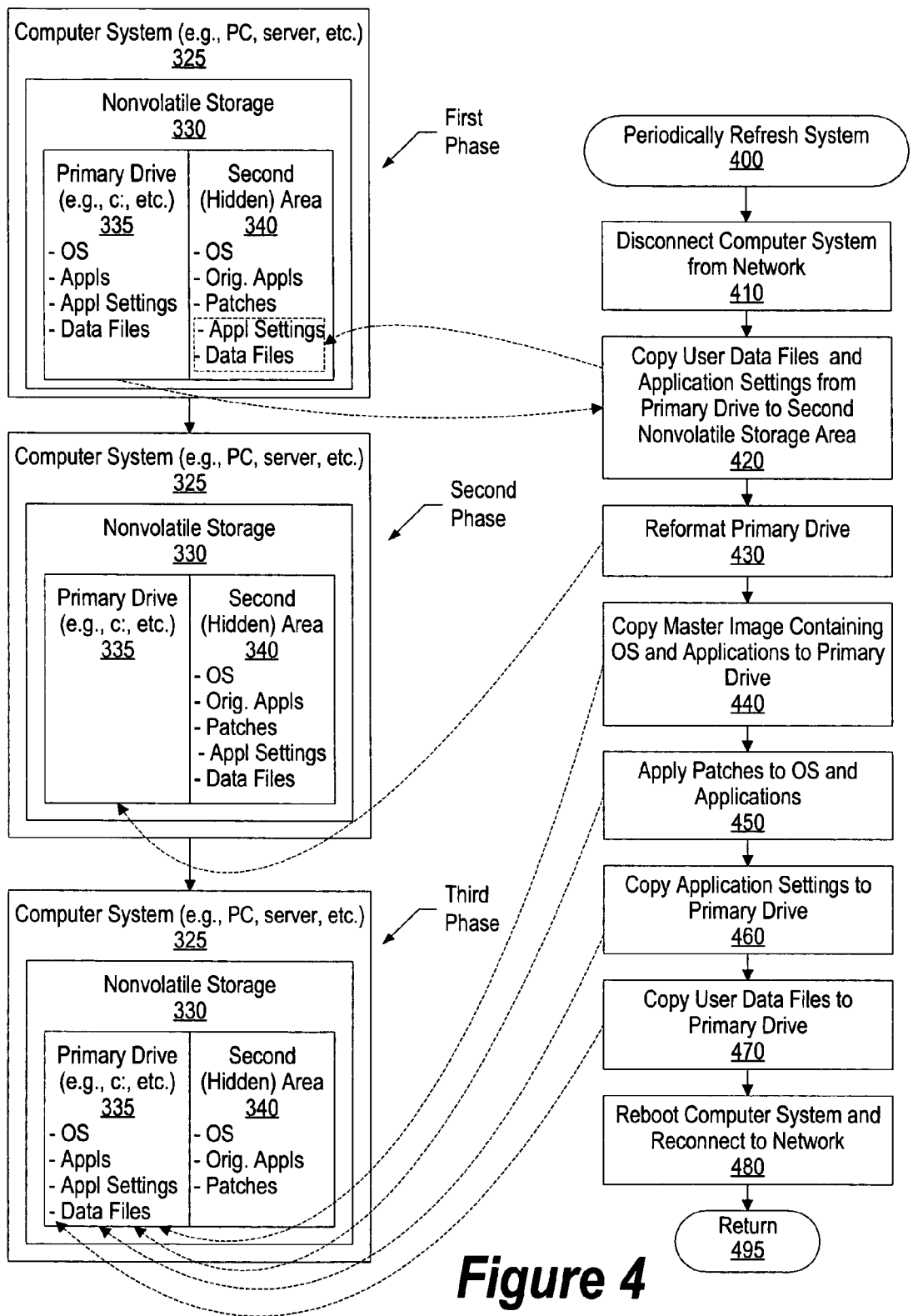
FIG. 4 is a second flowchart showing the steps taken to restore an organization's computer systems.

FIG. 2 is a flowchart showing set up steps taken to set up an organization's computer systems. FIGS. 2 through 4 describe steps taken in implementing a restoration tool that may be implemented as a logic chip, such as a microcontroller, or in software executed by a main processor or processors (see FIG. 11 and corresponding text for further details regarding an example of a computer system that is capable of performing the computing operations described in FIGS. 2 through 4). Processing commences at 200 whereupon, at step 210, the organization acquires the operating system and applications that it wishes to include in an approved image. At step 220, a model system is created with a primary drive and a second nonvolatile storage area, such as a hidden partition stored or located on the primary drive. Model computer system 225 is then used for loading of the operating system and applications onto the model computer's primary drive (step 230). At step 235, the restoration software is loaded onto the model computer system's primary drive. At step 240, image 250 is created of the model computer system's primary drive that includes the operating system, applications, and the restoration software. At step 255, image 250 is copied back to the second nonvolatile storage area.

At step 260, master image 270 is created of the model computer system. The master image includes an image of both the primary drive and the second nonvolatile storage area. At step 275, the master image is replicated onto the primary and second nonvolatile storage area of additional computer systems 280. These computer systems may include any type of computer system such as desktop computers, server computers, and laptop computers. At step 290, the computers set up with master image 270 are distributed to users throughout the organization. Set up processing thereafter ends at 295.

FIG. 3 is a first flowchart showing the steps taken to restore an organization's computer systems. Processing commences at 300 whereupon, at step 310, the organization creates a master image of the operating system and applications and stores the master image in nonvolatile data store 270 (for details on the creation of the master image, see, e.g., FIG. 2 and the detailed description corresponding to FIG. 2). At step 320, computer system 325 is initialized using the master image. As shown, computer system 325 includes nonvolatile storage 330. Nonvolatile storage includes primary drive 335 that the user uses on a day-to-day basis as well as second nonvolatile storage area 340, such as a hidden partition, a removable nonvolatile storage device, or the like. The initialized computer system is deployed to a user within the organization.

At step 345, the user uses computer system 325. Periodically, patches 360 are provided for the applications that were included in the master image as well as the operating system that was included in the operating system. In some environments, the patches are first received by the IT department and tested before being deployed to the users, in other environments the users are responsible for downloading the patches from computer network 150, such as the Internet, that interconnects the user's computer system with servers operated by application and operating system providers 130. At step 350, patches received at the user's computer system are applied to the operating system and applications stored on primary drive 335. In addition, a copy of the patch that was applied is stored on second nonvolatile storage area 340. Copies of patches are stored on the second nonvolatile storage area so that the patches can be re-applied after the master image is refreshed. At step 365, the user creates data files, such as word processing documents, spreadsheets, and the like, using the software applications available on primary drive 335. At step 370, the user customizes settings, such as menus, colors, and other preferences available on the operating system and applications stored on the primary drive.

If the user installs any unapproved software applications or any malware is stored on the computer system, the unapproved software and malware will be wiped off the computer system when it is periodically restored. In addition, some system files such as the system registry, may become corrupted with unused or unneeded entries. During the periodic restoration, such system files will be cleaned and returned to their original state. The computer system is periodically (e.g., daily, weekly, etc.) restored at a time that is convenient to the user, such as after hours when the user is not typically using the computer system (predefined process 375, see FIG. 4 and corresponding text for processing details).

A determination is made as to whether the user's computer system is being scrapped (decision 380). For example, after a long period of time the organization may decide to provide the user with a newer computer system with faster components and improved features. If the computer system is not being scrapped, decision 380 branches to "no" branch 382 and the user continues to use the computer system and the computer system continues to be periodically restored. This continues until the computer system is scrapped, at which point decision 380 branches to "yes" branch 388 whereupon, at step 390, nonvolatile storage 330 is completely formatted (or destroyed) to prevent others from accessing data stored by the user on the computer system. Processing thereafter ends at 395.

FIG. 4 is a second flowchart showing the steps taken to restore an organization's computer systems. Restoration processing commences at 400 whereupon, at step 410, the computer system is disconnected from the network. Disconnecting the computer system from the network prevents the computer system from being attacked by viruses and other malware that may reside on the network while the computer system is relatively vulnerable. For example, if a virus attacks computer systems with a particular operating system but a patch has been released by the operating system vendor to address the problem, the computer system may be vulnerable to attack after the master image is applied (step 440) and before the patch is applied to the operating system (step 450). However, if the second nonvolatile storage area is a network-accessible drive, then the network is not disconnected so that the second nonvolatile storage area can be accessed for storing and retrieving files.

During the "First Phase," the user's data files are copied from primary drive 335 to second nonvolatile storage area 340 by the restoration software (step 420). Also, at step 420, application and operating system settings are copied from primary drive 335 to second nonvolatile storage area 340. User data files are identified by extensions (e.g., ".doc," ".xls," ".wpd," etc.) as well as directory locations (e.g., "My Documents," etc.).

During the "Second Phase," the primary drive is reformatted at step 430. As used herein, "reformatted" is any method that erases all files from the primary drive. Reformatting thus results in all files on primary drive being erased. These files include files that comprise the operating system, the approved applications, application settings files, user data files, as well as any unapproved software programs, including malware, that may have been loaded on the primary drive.

During the "Third Phase," the primary drive is restored. At step 440, the master image that includes the operating system and the approved applications is copied from second nonvolatile storage area 340 to primary drive 335. At step 450, patches stored on second nonvolatile storage area 340 are applied to the operating system and the applications that now reside on primary drive 335. These patch files were collected and stored on second nonvolatile storage area 340 when patches were released by the IT department or the operating system/application vendors (see FIG. 3, step 350 for details). At step 460, application and operating system settings that were copied to the second nonvolatile storage area during step 420 are copied back to the primary drive and applied to the operating system or the respective application. At step 470, the user's data files that were also copied to the second nonvolatile storage area during step 420 are copied back to the primary drive.

After the computer system has been restored, at step 480 it is rebooted to restore the system data stored in memory and the computer system is reconnected to the computer network. Processing thereafter returns at 495.

Figure 5:
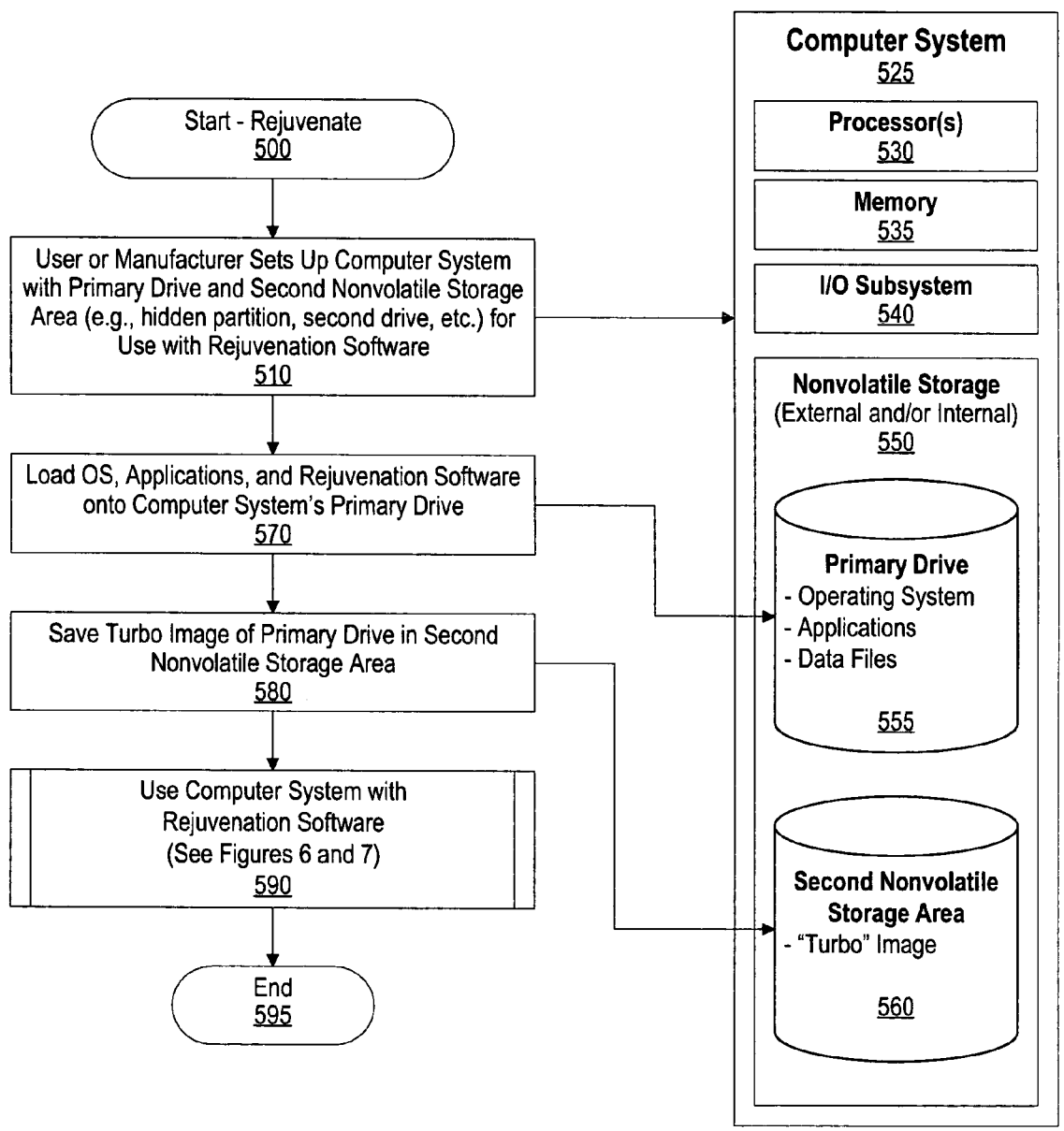
FIG. 5 is a system diagram showing a rejuvenation process.

FIG. 5 is a high level flowchart showing the steps taken during system rejuvenation. FIGS. 5 through 10 describe steps taken in implementing a rejuvenation tool that may be implemented as a logic chip, such as a microcontroller, or in software executed by a main processor or processors (see FIG. 11 and corresponding text for further details regarding an example of a computer system that is capable of performing the computing operations described in FIGS. 2 through 4). Processing commences at 500 whereupon, at step 510, the user or the computer system manufacturer sets up computer system 525 with primary drive 555 and second nonvolatile storage area 560. Computer system 525 further includes one or more processors 530, memory 535, I/O subsystem 540, and nonvolatile storage 550 (controllers and logic for managing internal and/or external nonvolatile storage devices).

At step 570, an operating system, applications, and rejuvenation software are loaded onto primary drive 555. The user uses the computer system for a period of time. At a point where the computer system is running optimally (step 580), the user requests the rejuvenation software to create an image of the primary drive and store the image on second nonvolatile storage area 560. The image is called a "turbo" image to indicate that the image is of the computer system when it was running optimally. As second nonvolatile storage area space allows, the user can create additional turbo images so that the user can rejuvenate the system back to any one of the turbo images saved to the second nonvolatile storage area.

The user then uses the computer system with the rejuvenation software (predefined process 590, see FIGS. 7-10 and corresponding text for processing details). As explained in detail below, the rejuvenation software allows the user to rejuvenate the computer system back to a point in time that the computer system was running optimally. Processing thereafter ends at 595.

Figure 6:
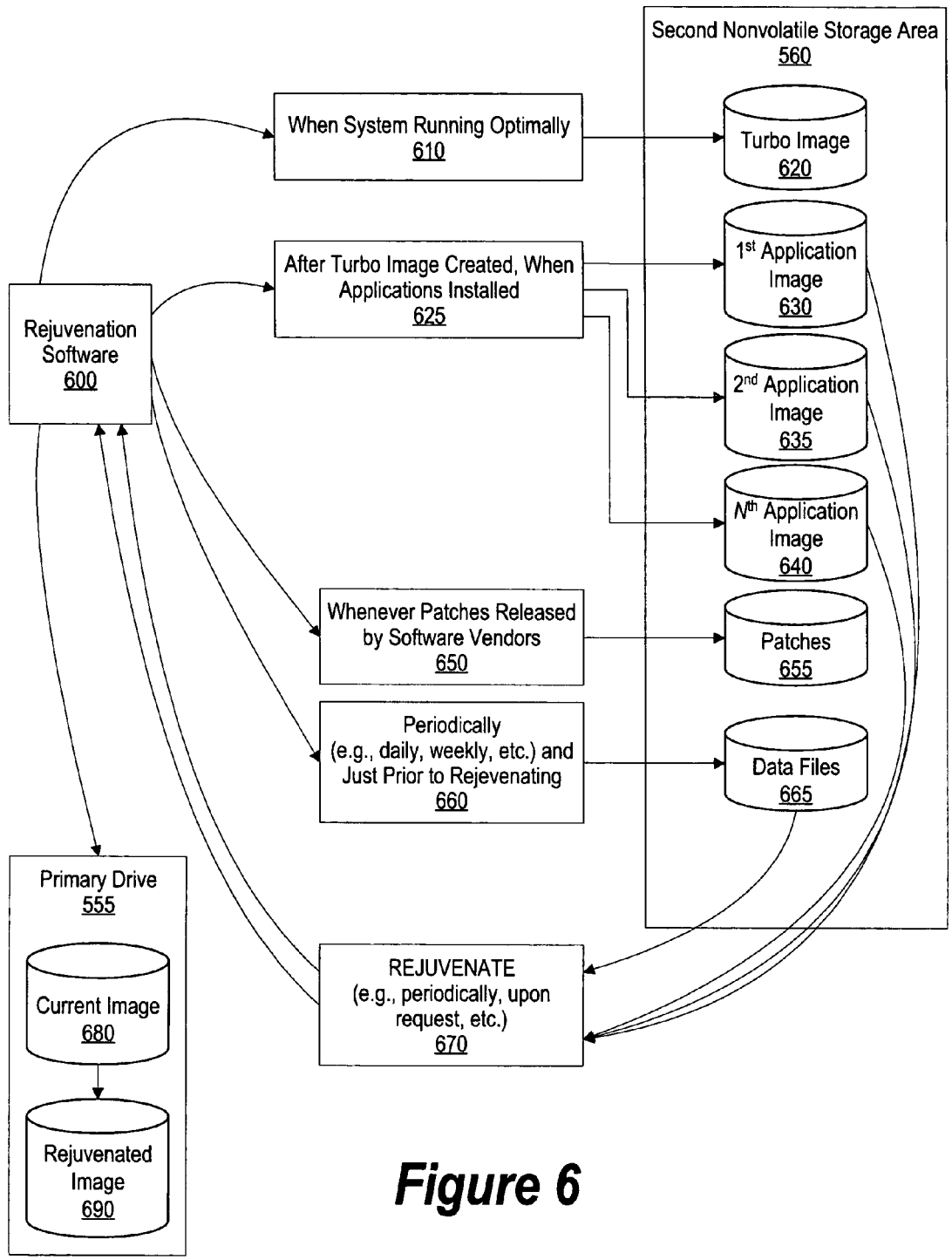
FIG. 6 is a high level flowchart showing the steps taken during system rejuvenation.

FIG. 6 is a system diagram showing a rejuvenation process. Rejuvenation software 600 is used at various points in time in order to rejuvenate a computer system by saving data to second nonvolatile storage area 560 and, when the system is no longer performing optimally, by retrieving data from the second nonvolatile storage area.

When the computer system is running optimally (step 610), the rejuvenation software is used to create an image of the computer system (turbo image 620). Turbo image 620 is an image of the primary drive including the operating system, the applications that have been installed, patches applied to the operating system and application, customizations that have been made to the operating system and applications, and data files that have been created using the operating system and the applications. Subsequent images can also be created either overwriting the original turbo image or additional turbo images can be created and stored on second nonvolatile storage area 560 as storage space permits. Having multiple turbo images 620 allows the user to select a turbo image to use for rejuvenating the computer system.

After the turbo image is created, when the user adds an application, such as a word processing application, the rejuvenation software can be used to store application images to second nonvolatile storage area (step 625). For example, if a word processing application is installed, the runtime files are installed on primary drive 555 and the operating system's registry is updated accordingly. The rejuvenation software creates an image of the media used to install the word processing application, such as the CD-ROM discs purchased by the user. If the word processor was purchased over the Internet, the files downloaded from the Internet used to install the application are stored to second nonvolatile storage area 560. In FIG. 6, several application images (630, 635, through 640) have been created. As images of the installation media, these files can be used to reinstall the applications after the computer system is rejuvenated using the turbo image. Also, because these applications were installed after the turbo image was created, they will not be on the primary drive after the primary drive is rejuvenated with the turbo image and will have to be reinstalled if the user wishes to continue using the applications.

Also after the turbo image has been created, whenever patches are released by software vendors corresponding to the operating system or any of the applications, the patch is applied to the software (operating system and/or applications) residing on the primary drive and a copy of the patch is stored (step 650) onto second nonvolatile storage area 560 in patches data store 655. Because these patches were applied after the turbo image was created, they will not be included in the operating system and applications after the primary drive is rejuvenated with the turbo image. Therefore, these patches will be reapplied by the rejuvenation software after the turbo image is copied back to the primary drive.

User data files, such as word processing documents, spreadsheets, and the like, are copied, at step 660, to second nonvolatile storage area 560 and are stored in data store 665. User-created data files are saved to subdirectories (or "folders"), such as "My Documents." The rejuvenation software copies the files in these subdirectories to the second nonvolatile storage area. In addition, data files can often be recognized by their file extensions, such as .doc, .wpd, etc. The rejuvenation software can search for user data file types throughout primary drive 555 and stores the files that are found to the second nonvolatile storage area. The user can also customize the applications and operating system, for example changing the background of the desktop, customizing the menus and toolbars, etc. In a sense, these customization files are user data files and are also identified by the rejuvenation software and copied from primary drive 555 to second nonvolatile storage area 560. Step 660 is performed just prior to rejuvenating the primary drive so that all of the user's data files are copied to the second nonvolatile storage area. In addition, step 660 can be performed periodically, such as daily, weekly, or monthly, in order to provide a backup copy of the user's data files.

Over time, the computer system becomes loaded with unused and unneeded applications with numerous unused entries added to the system registry. Some of these applications may be poorly behaved applications that run in the background and impede system performance. The result of the extra registry entries and applications is that the computer system starts running sluggishly. When the user notices that the computer system is running sluggishly, he requests that the primary drive of the system be rejuvenated (step 670). During rejuvenation, current image 680 residing on primary drive 555 is replaced with rejuvenated image 690. As detailed in FIG. 7-10, rejuvenated image 690 is created by reformatting primary drive 555, copying turbo image 620 to the primary drive, reinstalling any applications (630 through 640) that the user still wishes to use that were not included in the turbo image, reapplying any patches (655) to programs (programs being the operating system and the applications) both included in the turbo image as well as the applications installed afterwards. Finally, data files (665) are copied back to the primary drive into their correct locations (i.e., subdirectories, folders, etc.). The resulting rejuvenated image 690 is now running the turbo image with patches applied along with the user data files that were present prior to rejuvenating the system.

Figure 7:
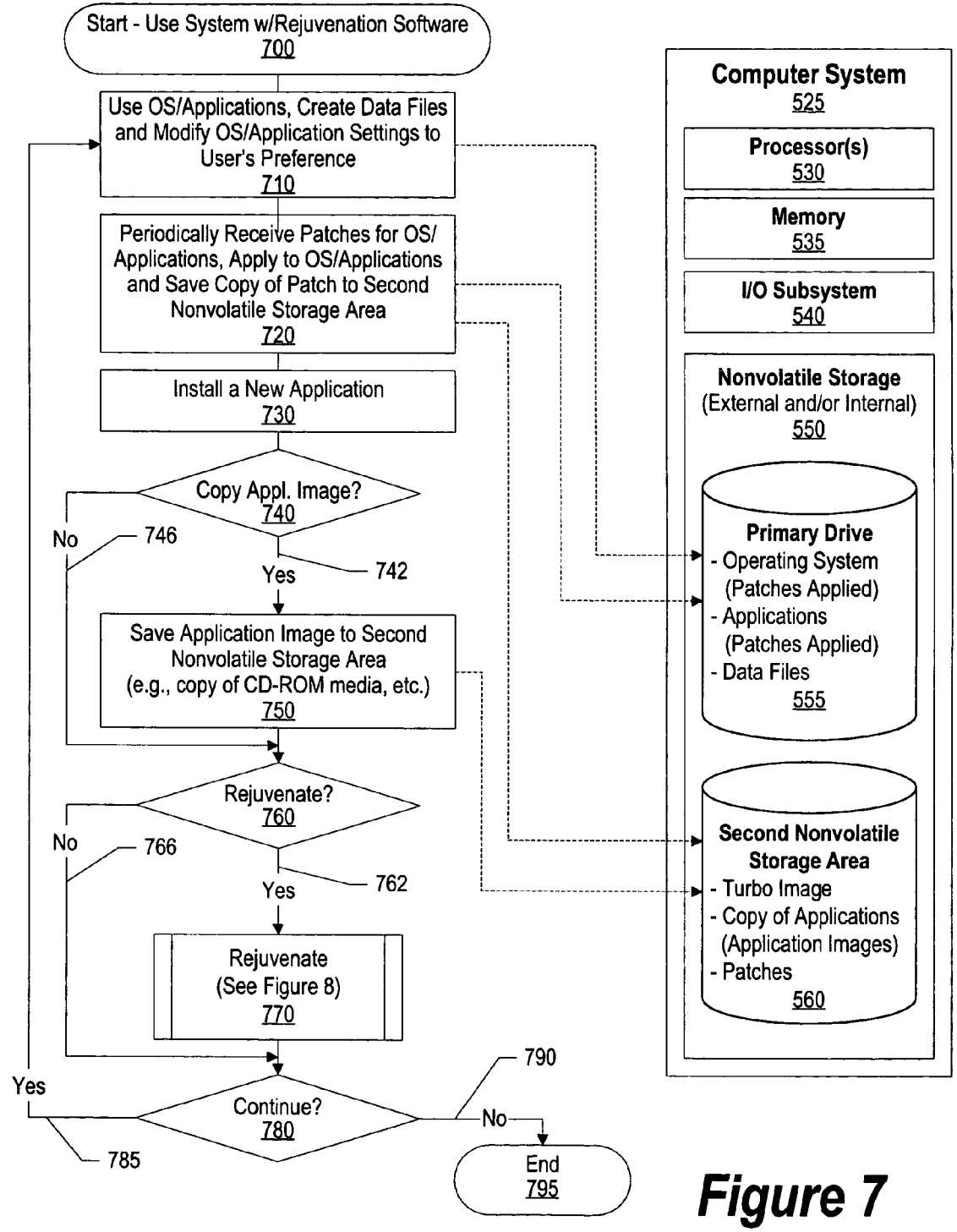
FIG. 7 is a flowchart showing steps taken while the user is using a computer system enabled with rejuvenation software.

FIG. 7 is a flowchart showing steps taken while the user is using a computer system enabled with rejuvenation software. Processing commences at 700 whereupon, at step 710, the user uses the operating system and applications stored on the primary drive to create data files (e.g., word processing documents, spreadsheets, etc.) and modifies operating system and application settings (e.g., menus, colors, and other preferences available on the operating system and applications stored on the primary drive). These user files and preferences are stored on primary drive 555. Periodically, at step 720, the user's computer system receives patches to the operating system and/or applications stored on the primary drive. These patches may be manually downloaded by the user from a website, such as a website hosted by an application provider, or may be part of an automatic process where the application or operating system provider automatically sends patch files to the user's computer when such patches are made available. In step 720, the patches are applied to programs (the operating system and/or applications) on primary drive 555. In addition, a copy of the patch file is stored on second nonvolatile storage area 560. When the user installs a new software application (step 730), a determination is made as to whether the user wants to save an image of the application media (e.g., an image of the CD-ROM discs used to install the application, etc.) onto second nonvolatile storage area 560. If the user wants to copy the application image, decision 740 branches to "yes" branch 742 whereupon, at step 750, the application image is copied and stored to second nonvolatile storage area 560. On the other hand, if the user does not want to copy the application image, decision 740 branches to "no" branch 746 bypassing step 750.

In an organizational setting, the IT department can determine which application images and patches are stored to the second nonvolatile storage area. A policy allowing only IT-approved applications and patches to be stored on the second nonvolatile storage area would prevent patches that are faulty or cause disruption from being applied. Furthermore, this policy would allow the organization to follow licensing provisions agreed to with the operating system and application vendors regarding the storage of backup images.

A determination is made as to whether the user wants to rejuvenate the computer system (decision 760). If the user wants to rejuvenate the system at this time, decision 760 branches to "yes" branch 762 whereupon the computer system is rejuvenated (predefined process 770, see FIG. 8 and corresponding text for processing details). On the other hand, if the user does not wish to rejuvenate the system, decision 760 branches to "no" branch 766 bypassing predefined process 770.

In an organizational setting, the IT department may determine when (how often) the users' computer systems are rejuvenated. This could be accomplished by configuring the rejuvenation software to operate at the IT-determined frequency or by having the users' computer systems receive a signal from the IT department instruction the users' computer systems to perform rejuvenation processing.

A determination is made as to whether the user wants to continue using the computer system (decision 780). If the user wants to continue using the computer system, decision 780 branches to "yes" branch 785 which loops back to the using of the computer system, receiving of patches, and installing of new applications. This continues until the user no longer wishes to use the system, at which point decision 780 branches to "no" branch 790 and processing ends at 795.

Figure 8:
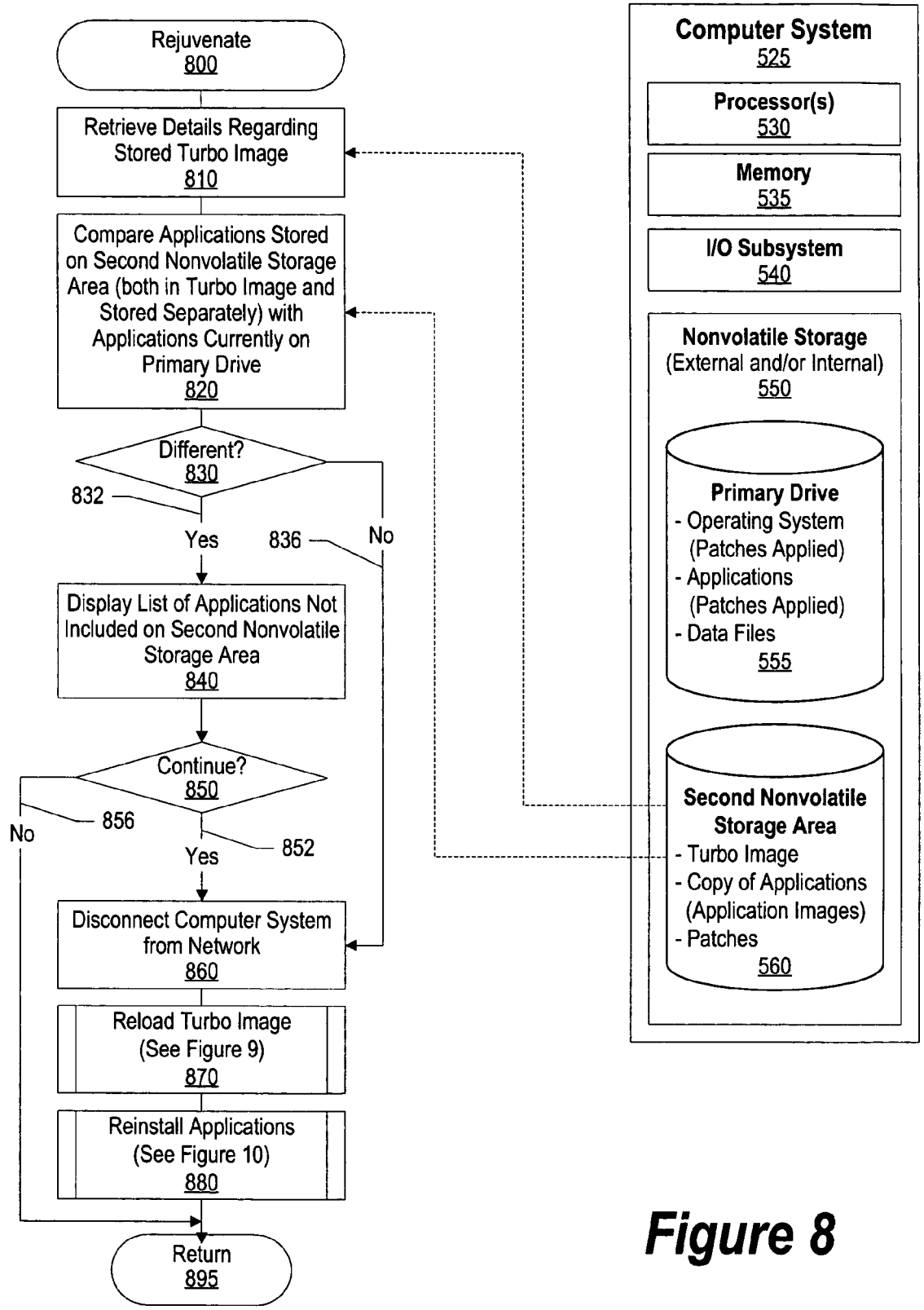
FIG. 8 is a flowchart showing the steps taken when the user requests rejuvenation of the computer system.

FIG. 8 is a flowchart showing the steps taken when the user requests rejuvenation of the computer system. Processing commences at 800 whereupon, at step 810, details regarding the turbo image, or images, saved on second nonvolatile storage area 560 are retrieved. At step 820, a comparison is made between the applications stored on second nonvolatile storage 560 area and the applications currently installed on the primary drive 555. The applications on the second nonvolatile storage area include both the applications included in the turbo image (see, e.g., turbo image 620 on FIG. 6) as well as application images that reside on the second nonvolatile storage area (see, e.g., application images 630 through 640 on FIG. 6).

A determination is made as to whether the list of applications stored on the second nonvolatile storage area is different from the applications installed on the primary drive (decision 830). If the list is different, decision 830 branches to "yes" branch 832 whereupon, at step 840, a list of the applications that are not on the second nonvolatile storage area is displayed with a message that these applications, if desired, will have to be installed manually (i.e., using the media, such as CD-ROM discs, that were used to originally install the application). After viewing the list of differences, the user is asked whether he wishes to continue rejuvenating the computer system (decision 850). If the user wishes to continue, decision 850 branches to "yes" branch 852 to commence rejuvenating, however if the user does not wish to rejuvenate the system, decision 850 branches to "no" branch 856 bypassing the rejuvenation steps. Returning to decision 830, if there are no differences between the list of applications on the primary drive and those stored on the second nonvolatile storage area, decision 830 branches to "no" branch 836 bypassing step 840 and decision 850 and commencing with the rejuvenation steps.

The rejuvenation steps commence at step 860 with the computer system being disconnected from any computer networks, such as the Internet. The user's computer system is disconnected from any networks so that the computer system is not vulnerable to viruses and other malicious attacks while being rejuvenated. However, if the second nonvolatile storage area is a network-accessible drive, then the network is not disconnected so that the second nonvolatile storage area can be accessed for storing and retrieving files.

Figure 9:
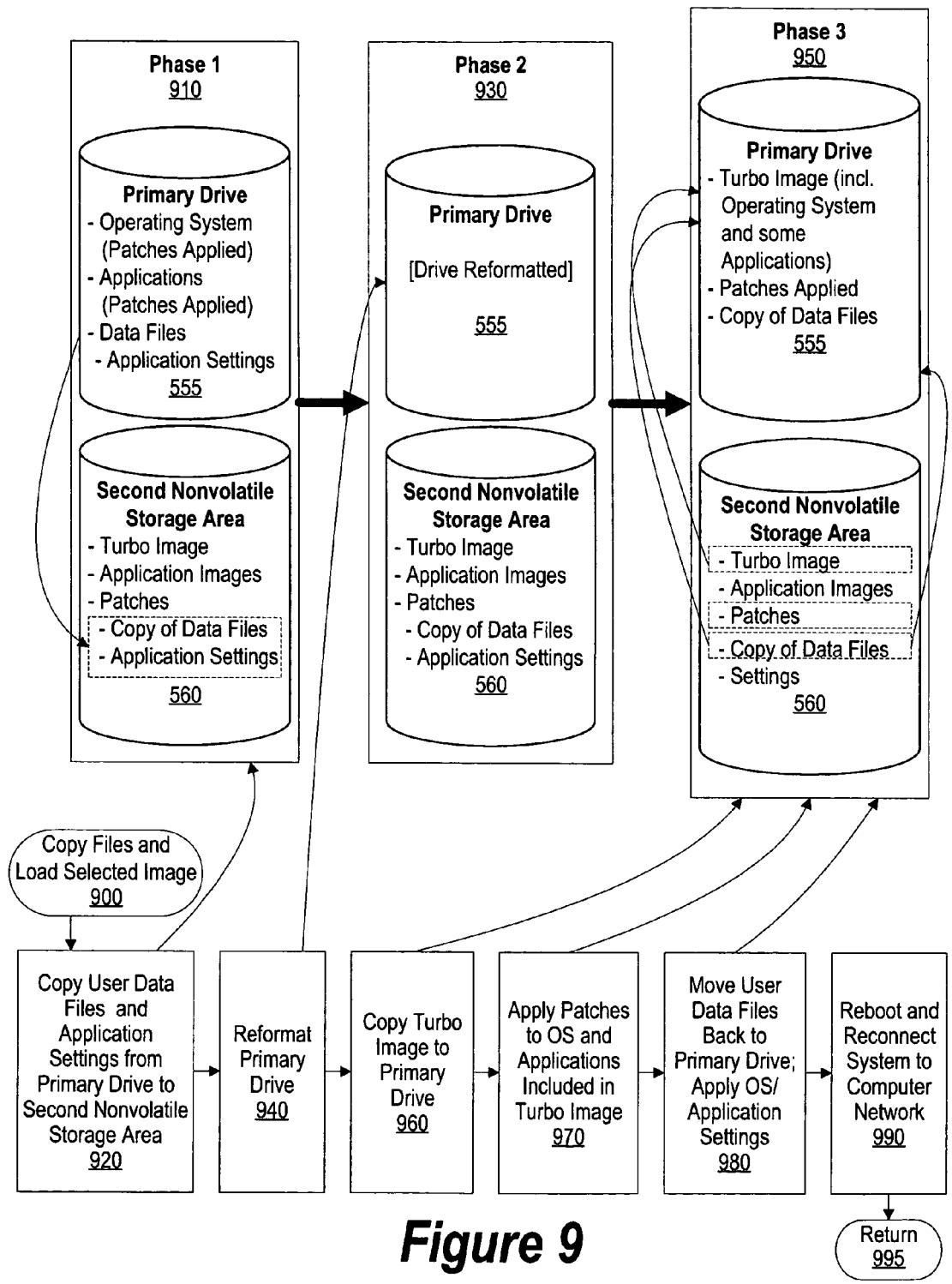
FIG. 9 is a flowchart showing the steps taken in copying the user's files and loading the turbo image onto the primary drive of the user's computer system.

The turbo image is then loaded onto the primary drive (predefined process 870, see FIG. 9 and corresponding text for processing details). If more than one turbo image is available, then the image selected by the user is reloaded onto the primary drive. After the turbo image is copied to the primary drive, applications that were on the primary drive but not included in the turbo image are reinstalled (predefined process 880, see FIG. 10 and corresponding text for processing details). Processing thereafter returns to the calling routine at 895.

FIG. 9 is a flowchart showing the steps taken in copying the user's files and loading the turbo image onto the primary drive of the user's computer system. Processing commences at 900 whereupon phase 1 (910) commences at step 920 with user data files and application settings being copied from primary drive 555 to second nonvolatile storage area 560.

Phase 2 (930) commences at step 940 with primary drive 555 being reformatted (i.e., the operating system, applications, and data files residing on the primary drive are erased). Phase 2 prepares the primary drive for rejuvenation of the turbo image and applications.

Phase 3 (950) commences at step 960 with the turbo image being copied from second nonvolatile storage area 560 to primary drive 555. After step 960 completes, the primary drive is in the same state the drive was in when the turbo image was taken. At step 970, patch files stored on second nonvolatile storage area 560 after the turbo image was created are applied to the programs (applications and operating system) that were included in the turbo image and copied to the primary drive. Patch files are typically programs that operate to modify programs in order to fix problems, such as software errors, or address security issues identified with the programs that may make the programs vulnerable to attack by hackers and malware. At step 980, user data files and application settings are copied from second nonvolatile storage area 560 to their original locations (i.e., subdirectories) on primary drive 555.

At step 990, the computer system is rebooted so that the rejuvenated computer system settings are loaded into the computer system memory, and the computer system is reconnected to any networks to which the system was originally connected. Processing thereafter returns at 995.

Figure 10:
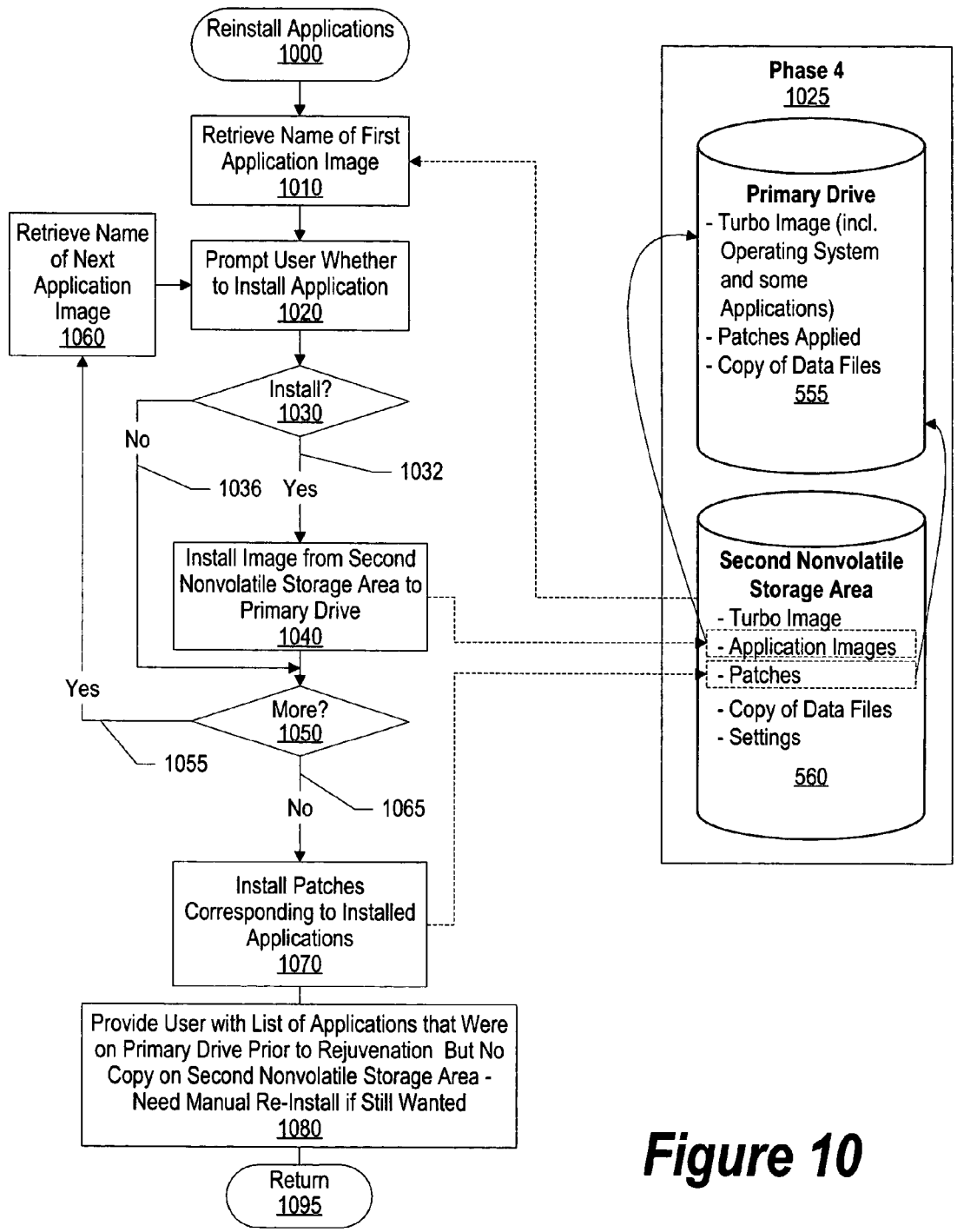
FIG. 10 is a flowchart showing the steps taken in reinstalling applications onto the primary drive from the second nonvolatile storage area.

FIG. 10 is a flowchart showing the steps taken in reinstalling applications onto the primary drive from the second nonvolatile storage area. Phase 4 (1025) processing commences at 1000 whereupon, at step 1010 the name of the first application image stored on second nonvolatile storage area 560 is retrieved. The user is prompted as to whether the user wishes to reinstall the application at step 1020. A determination is made as to whether the user wishes to reinstall the application (decision 1030). If the user has requested reinstallation of the application, decision 1030 branches to "yes" branch 1032 whereupon the application is installed onto primary drive 555 using the image stored on second nonvolatile storage area 560. For example, a setup or installation program included in the application image is identified and executed. On the other hand, if the user does not wish to install the application, decision 1030 branches to "no" branch 1036 bypassing step 1040. In this manner, if the installation of a particular program caused the original performance issues leading to rejuvenation, that program can be removed from the system by reloading the turbo image, patches, and user data files, but not reinstalling the particular application during phase 4.

A determination is made as to whether there are more application images stored on second nonvolatile storage area 560 (decision 1050). If there are more application images, decision 1050 branches to "yes" branch 1055 which retrieves the name of the next application image and loops back to determine whether the user wishes to reinstall the next application. This looping continues until all applications stored on the second nonvolatile storage area have been processed (i.e., either reinstalled or not reinstalled, as specified by the user), at which point decision 1050 branches to "no" branch 1065.

At step 1070, patches stored on second nonvolatile storage area 560 that correspond to the applications reinstalled during the invocations of step 1040 are reapplied to the applications. At step 1080, the user is provided with a list of applications that were originally on the primary drive before rejuvenation took place and were not included in the turbo image nor in any of the application images stored on the second nonvolatile storage area. The user can choose whether to reinstall this list of applications using other media (e.g., CD-ROM discs that were included with the application purchase). Processing thereafter returns at 1095.

Figure 11:
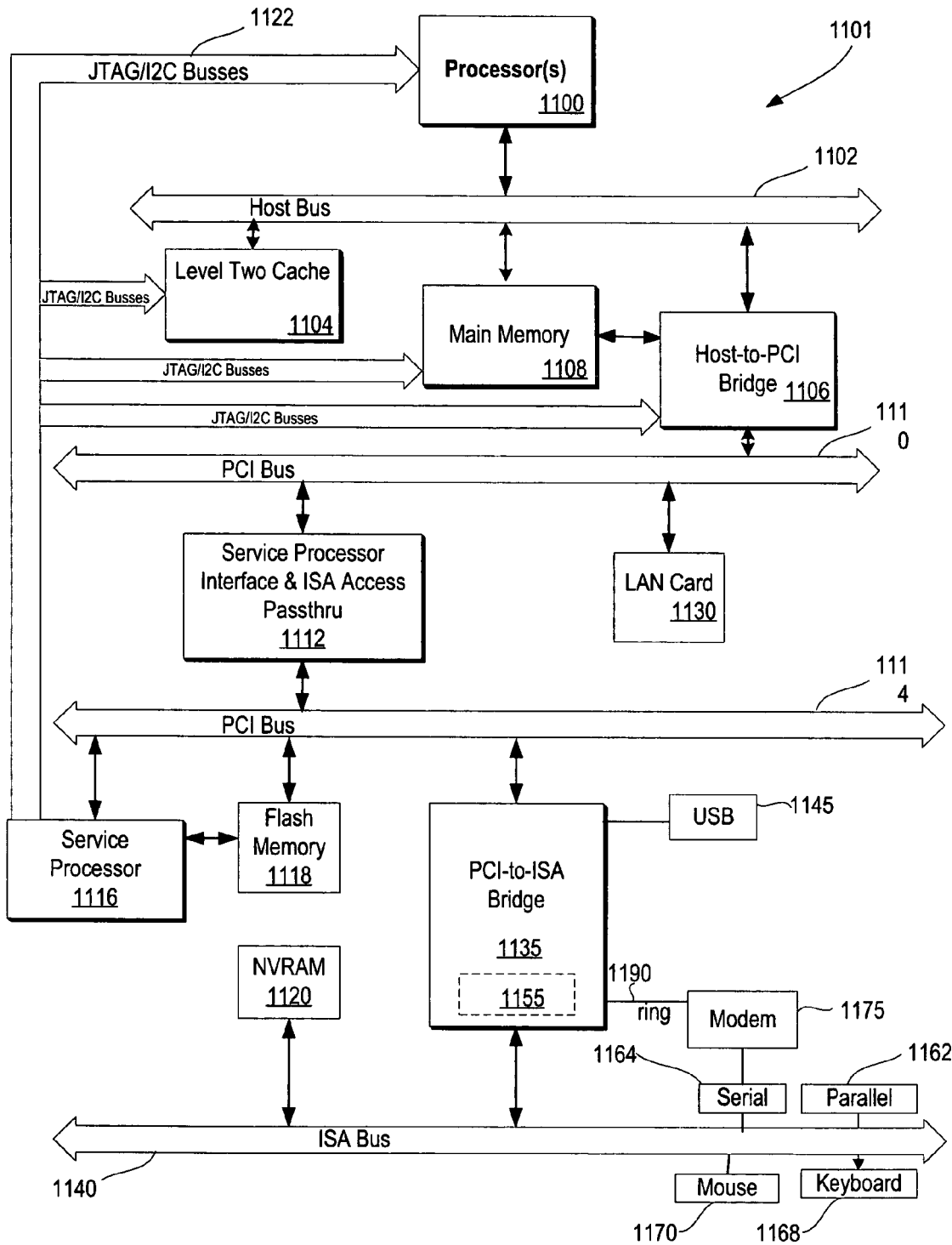
FIG. 11 is a block diagram of a computing device capable of implementing the present invention.

FIG. 11 illustrates information handling system 1101 which is a simplified example of a computer system capable of performing the computing operations described herein. Computer system 1101 includes processor 1100 which is coupled to host bus 1102. A level two (L2) cache memory 1104 is also coupled to host bus 1102. Host-to-PCI bridge 1106 is coupled to main memory 1108, includes cache memory and main memory control functions, and provides bus control to handle transfers among PCI bus 1110, processor 1100, L2 cache 1104, main memory 1108, and host bus 1102. Main memory 1108 is coupled to Host-to-PCI bridge 1106 as well as host bus 1102. Devices used solely by host processor(s) 1100, such as LAN card 1130, are coupled to PCI bus 1110. Service Processor Interface and ISA Access Pass-through 1112 provides an interface between PCI bus 1110 and PCI bus 1114. In this manner, PCI bus 1114 is insulated from PCI bus 1110. Devices, such as flash memory 1118, are coupled to PCI bus 1114. In one implementation, flash memory 1118 includes BIOS code that incorporates the necessary processor executable code for a variety of low-level system functions and system boot functions.

PCI bus 1114 provides an interface for a variety of devices that are shared by host processor(s) 1100 and Service Processor 1116 including, for example, flash memory 1118. PCI-to-ISA bridge 1135 provides bus control to handle transfers between PCI bus 1114 and ISA bus 1140, universal serial bus (USB) functionality 1145, power management functionality 1155, and can include other functional elements not shown, such as a real-time clock (RTC), DMA control, interrupt support, and system management bus support. Nonvolatile RAM 1120 is attached to ISA Bus 1140. Service Processor 1116 includes JTAG and I2C busses 1122 for communication with processor(s) 1100 during initialization steps. JTAG/I2C busses 1122 are also coupled to L2 cache 1104, Host-to-PCI bridge 1106, and main memory 1108 providing a communications path between the processor, the Service Processor, the L2 cache, the Host-to-PCI bridge, and the main memory. Service Processor 1116 also has access to system power resources for powering down information handling device 1101.

Peripheral devices and input/output (I/O) devices can be attached to various interfaces (e.g., parallel interface 1162, serial interface 1164, keyboard interface 1168, and mouse interface 1170 coupled to ISA bus 1140. Alternatively, many I/O devices can be accommodated by a super I/O controller (not shown) attached to ISA bus 1140.

In order to attach computer system 1101 to another computer system to copy files over a network, LAN card 1130 is coupled to PCI bus 1110. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
installing a plurality of programs on a primary drive of a computer system, wherein the programs include an operating system and one or more applications;
using the programs installed on the primary drive for a first period of time;
during the first period of time, storing one or more user data files on the primary drive;
creating a first image of the primary drive after the first period of time has elapsed, the creating including storing a copy of the first image on a second nonvolatile storage area accessible from the computer system;
in response to creating the first image of the primary drive, using the programs installed on the primary drive for a second period of time;
during the second period of time:
    installing a new application;
    storing the new application as an application image on the second nonvolatile storage area; and
    storing one or more additional user data files on the primary drive;
rejuvenating the primary drive after the second period of time has elapsed, the rejuvenating including:
    copying the user data files and the additional user data files from the primary drive to the second nonvolatile storage area;
    in response to the copying, reformatting the primary drive;
    copying the first image from the second nonvolatile storage area to the reformatted primary drive;
    recopying the user data files and the additional user data files from the second nonvolatile storage area to the reformatted primary drive;
    prompting a user whether to reinstall the new application stored as an application image on the second nonvolatile storage area;
    in response to the prompting, receiving a response from the user;
    in response to receiving a yes response, reinstalling the new application from the second nonvolatile storage area to the reformatted primary drive; and
    in response to receiving a no response, not reinstalling the new application.

2. The method of claim 1 wherein the second nonvolatile storage area is a hidden partition of the primary drive.

3. The method of claim 1 further comprising:
during the second period of time:
    receiving one or more patches corresponding to the programs;
    applying the patches to the programs stored on the primary drive; and
    saving a copy of the patches on the second nonvolatile storage area.

4. The method of claim 3 further comprising:
during the rejuvenating:
    applying the patches to the programs stored on the reformatted primary drive after the first image is copied from the second nonvolatile storage area to the reformatted primary drive.

5. The method of claim 1 wherein the user data files include one or more application settings files corresponding to at least one of the applications.

6. An information handling system comprising:
one or more processors;
a memory accessible by the processors;
a primary drive accessible by the processors, wherein a plurality of programs are installed on the primary drive, the plurality of programs including an operating system and one or more applications;
a second nonvolatile storage area accessible by the processors, wherein the second nonvolatile storage area is a hidden partition of the primary drive; and
a rejuvenation tool having access to the primary drive and the second nonvolatile storage area, wherein the rejuvenation tool is effective to:
during a first period of time that the programs are used on the primary drive, store one or more user data files on the primary drive;
create a first image of the primary drive after the first period of time has elapsed and store the first image on the second nonvolatile storage area;
during a second period of time that the programs are used on the primary drive:
    install a new application;
    store the new application as an application image on the second nonvolatile storage area; and
    store one or more additional user data files on the primary drive;
rejuvenate the primary drive after the second period of time has elapsed, the rejuvenation being effective to:
    copy the user data files and the additional user data files from the primary drive to the second nonvolatile storage area;
    reformat the primary drive after the copying;
    copy the first image from the second nonvolatile storage area to the reformatted primary drive;
    recopy the user data files and the additional user data files from the second nonvolatile storage area to the reformatted primary drive;
    prompt a user whether to reinstall the new application stored as an application image on the second nonvolatile storage area;
    receive a response to the prompt from the user;
    reinstall the new application from the second nonvolatile storage area to the reformatted primary drive upon receiving a yes response from the user; and
    not reinstall the new application in response to receiving a no response from the user.

7. The information handling system of claim 6 wherein the rejuvenation tool is further effective to:
receive one or more patches corresponding to the programs during the second period of time;
apply the patches to the programs stored on the primary drive; and save a copy of the patches on the second nonvolatile storage area.

8. The information handling system of claim 7 wherein the rejuvenation tool is further effective to:
apply the patches to the programs stored on the reformatted primary drive after the first image is copied from the second nonvolatile storage area to the reformatted primary drive.

9. The information handling system of claim 6 wherein the user data files include one or more application settings files corresponding to at least one of the applications.

10. The information handling system of claim 6 wherein the rejuvenation tool is further effective to:
copy an application installation media onto the second nonvolatile storage area, wherein the application installation media was used to install the new application on the primary drive during the second period of time; and
reinstall the new application onto the reformatted primary drive using the application installation media stored on the second nonvolatile storage area after the first image has been recopied to the primary drive.

11. A product comprising:
a computer usable medium having computer readable program code stored therein, the computer readable program code in said product being effective to:
install a plurality of programs on a primary drive of a computer system, wherein the programs include an operating system and one or more applications;
use the programs installed on the primary drive for a first period of time;
during the first period of time, store one or more user data files on the primary drive;
create a first image of the primary drive after the first period of time has elapsed, the creation of the first image including software code effective to store a copy of the first image on a second nonvolatile storage area accessible from the computer system;
in response to the creation of the first image, use the programs installed on the primary drive for a second period of time;
during the second period of time:
install a new application;
store the new application as an application image on the second nonvolatile storage area; and
store one or more additional user data files on the primary drive;
rejuvenate the primary drive after the second period of time has elapsed, the rejuvenation including software code effective to:
copy the user data files and the additional user data files from the primary drive to the second nonvolatile storage area;
in response to the copying, reformat the primary drive;
copy the first image from the second nonvolatile storage area to the reformatted primary drive;
recopy the user data files and the additional user data files from the second nonvolatile storage area to the reformatted primary drive;
prompt a user whether to reinstall the new application stored as an application image on the second nonvolatile storage area;
receive a response to the prompt from the user;
reinstall the new application from the second nonvolatile storage area to the reformatted primary drive upon receiving a yes response from the user; and
not reinstall the new application in response to receiving a no response from the user.

12. The product of claim 11 wherein the second nonvolatile storage area is a hidden partition of the primary drive.

13. The product of claim 11 further comprising program code effective to:
receive one or more patches corresponding to the programs during the second period of time;
apply the patches to the programs stored on the primary drive; and
save a copy of the patches on the second nonvolatile storage area.

14. The product of claim 13 further comprising program code effective to:
apply the patches to the programs stored on the reformatted primary drive after the first image is copied from the second nonvolatile storage area to the reformatted primary drive.

15. The product of claim 11 wherein the user data files include one or more application settings files corresponding to at least one of the applications.

16. The method of claim 1 wherein installing the new application further comprises:
using an application installation media to install the new application on the primary drive;
copying the application installation media onto the second nonvolatile storage area; and
wherein reinstalling the new application from the second nonvolatile storage area to the reformatted primary drive further comprises using the application installation media stored on the second nonvolatile storage area to reinstall the new application on the reformatted primary drive.

17. The method of claim 1 wherein rejuvenating the primary drive further comprises:
comparing the primary drive to the second nonvolatile storage area;
in response to the comparing, determining that one or more unsaved applications are present on the primary drive, wherein the unsaved applications are not stored on the second nonvolatile storage area;
in response to the determining, displaying a list of the unsaved applications to the user; and
in response to the displaying, querying the user to determine if the user wants to proceed with the rejuvenating.

18. The information handling system of claim 6 wherein the rejuvenation tool is further effective to:
compare the primary drive to the second nonvolatile storage area;
determine that one or more unsaved applications are present on the primary drive based on the comparison, wherein the unsaved applications are not stored on the second nonvolatile storage area;
display a list of the unsaved applications to the user in response to the determining; and
query the user to determine if the user wants to proceed with the rejuvenating.

19. The product of claim 11 further comprising program code effective to:
use an application installation media to install the new application on the primary drive;
copy the application installation media onto the second nonvolatile storage area; and
wherein reinstalling the new application from the second nonvolatile storage area to the reformatted primary drive further comprises program code effective to use the application installation media stored on the second nonvolatile storage area to reinstall the new application on the reformatted primary drive.

20. The product of claim 11 further comprising program code effective to:

compare the primary drive to the second nonvolatile storage area;

determine that one or more unsaved applications are present on the primary drive based on the comparison, wherein the unsaved applications are not stored on the second nonvolatile storage area;

display a list of the unsaved applications to the user in response to the determining; and query the user to determine if the user wants to proceed with the rejuvenating.

* * * * *